United States Patent [19]

Oddy

[11] 3,966,534

[45] June 29, 1976

[54] LETTERPRESS PRINTING MACHINE

[76] Inventor: Keith Mason Oddy, 58 Baldwin Road, Kidderminster, England

[22] Filed: Jan. 30, 1974

[21] Appl. No.: 437,947

[52] U.S. Cl. ................................ 156/384; 156/267; 156/268; 156/269; 156/271; 156/510; 156/528; 156/584

[51] Int. Cl.² ........................................ B32B 31/18

[58] Field of Search ........... 156/246, 247, 248, 249, 156/252, 253, 254, 256, 257, 263, 264, 265, 267, 277, 384, 512, 517, 521, 528, 541, 584, DIG. 28, DIG. 33

[56] References Cited

UNITED STATES PATENTS

| | | | |
|---|---|---|---|
| 2,304,787 | 12/1942 | Avery | 156/584 |
| 3,457,137 | 7/1969 | McCarthy | 156/248 |
| 3,522,136 | 7/1970 | Williams et al. | 156/584 |
| 3,694,287 | 9/1972 | Marshall | 156/257 |

*Primary Examiner*—Caleb Weston
*Attorney, Agent, or Firm*—Melvin A. Crosby

[57] ABSTRACT

Apparatus used, inter alia, for the production of printed labels employing self-adhesive stock mounted on a backing sheet. The labels are chosen as regards content or layout and as regards width by the user, the apparatus being capable of producing labels of any kind. The blank stock is fed through a printing device and thereafter through a rotary die-cutter. The printed and die-cut stock is then fed to a location at which the backing sheet supporting the printed labels are separated from the waste paper. At said location, an abrupt change of direction in the path of travel is imparted to the backing sheet.

10 Claims, 3 Drawing Figures

Figure 1:
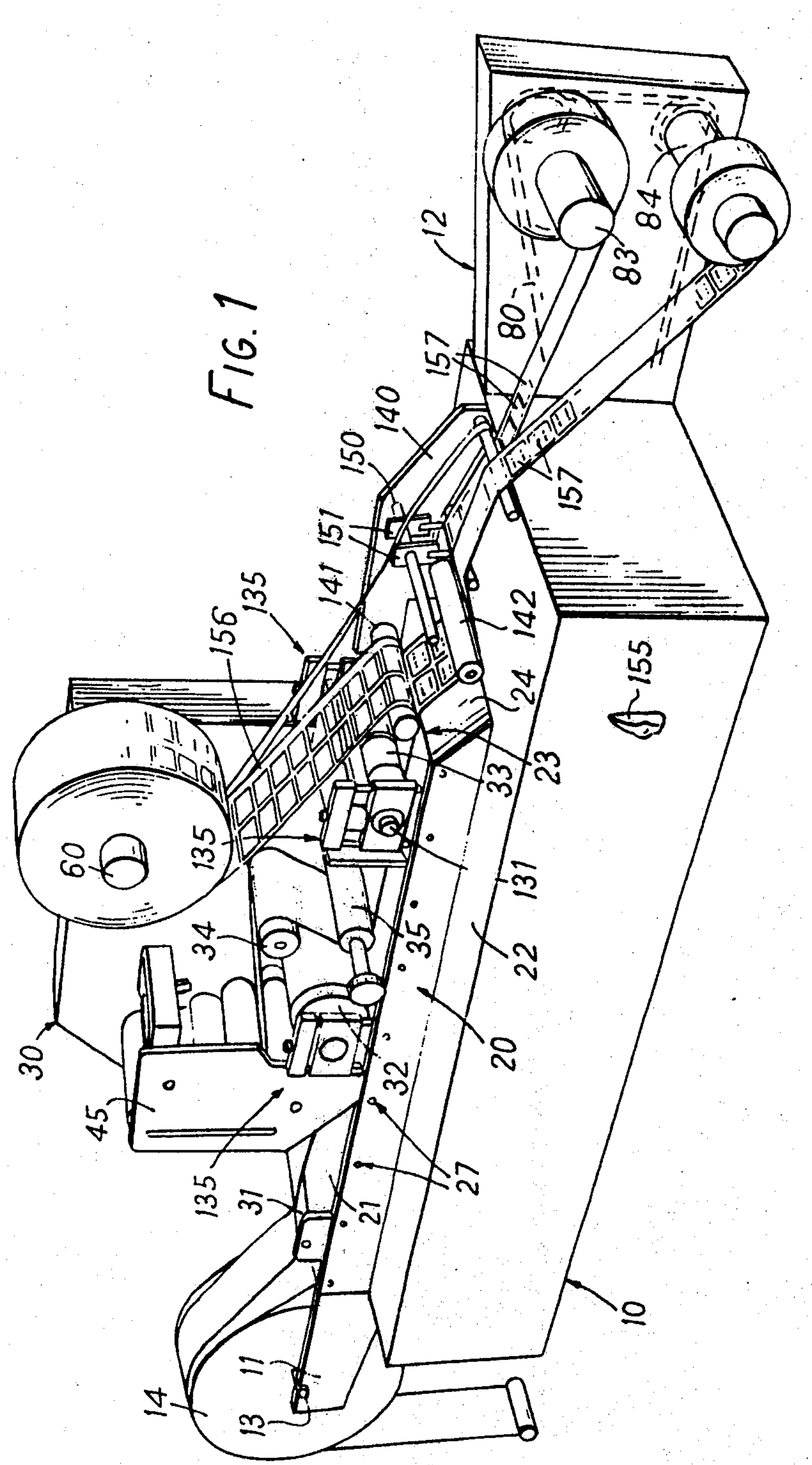

37
36
117
115
51
44
116
120
123
101
122
120
114
113
112
30
38
40
41
39
125
126
60
128
124
98
127
129
131
130
100
135

LETTERPRESS PRINTING MACHINE

This invention relates to a web-fed letterpress printing machine.

In order to print and die-cut labels using self-adhesive stock (by which term, as employed herein, is meant paper coated on one side with a contact adhesive and supported by a backing sheet from which the adhesive-coated paper can easily be stripped), it has been customary to use relief printing followed by either rotary die-cutting or flat die-cutting. One disadvantage of using the manufacturing process of which flat-die cutting is an essential step is that the process is intermittent because the web to be die-cut must be stopped at frequent regular intervals to permit said die-cutting to be effected. This seriously reduces the output of the machine.

One can overcome the low output problem by using rotary die-cutting but, in this case, it has always been considered that it is essential to employ the flexography printing process which differs from the letterpress printing process in the use of rapid-drying inks in which the solvent is usually alcohol, although water-based inks are now commonly used. Nevertheless, in the flexographic printing process, rapid drying of the ink is by evaporation of the solvent and it is this rapid drying of the ink which has always, until now, been considered to be essential, if one intended to use a rotary die-cutter, because of the inherent danger of the ink becoming smudged.

However, I have discovered that one can use the letterpress printing process, which uses an ink paste whose liquid component is rapidly absorbed by the paper stock leaving a print which can be handled safely, followed by a rotary die-cutting step provided that care is taken to ensure that ink-smudging cannot take place at the point or location at which the waste is stripped from the backing sheet to leave only the printed labels adhering to the backing sheet.

United States Patent No. 3,522,136 discloses a label-producing apparatus which includes means for separating the matrix or waste from the carrier strip or backing sheet. Said means include a stripper member which extends across the width of the web as the web moves between said stripper member and a support structure which supports the web. The stripper member has end or abutment portions which are spaced from the support structure by such a small distance that marginal edge portions of said matrix or waste and of said carrier strip or backing sheet are kept close to the surface of said support structure. The stripper member also has an intermediate portion extending from one of said end or abutment portions to the other and the intermediate portion is spaced from the said surface of the support structure by a distance which is much larger than the small distance referred to above. A continuous printed label sheet is moved to a cutting location whereat it is cut by a rotary die cutter to form printed labels and said matrix or waste is stripped from the carrier strip or backing sheet by being drawn upwardly away from the carrier strip or backing sheet which is kept moving along the support structure with the printed labels thereon. According to said Specification, it has been found that the tendency of the printed labels to move away from the carrier strip or backing sheet was negligible when a sharp or acute angle exists between the matrix or waste on the one hand and the carrier strip or backing sheet on the other hand.

It becomes evident from a comparison of the various Figures of drawings of said United States Patent Specification that, whatever the width of the printed label, there must be end portions or abutment portions of the stripper member in register with the longitudinally extending portions of the matrix or waste. Thus, in FIGS. 1, 2, 3, 4 and 6 there are illustrated various forms of stripper member all of which are for stripping matrix or waste from the carrier strip or backing sheet to leave a succession (longitudinally of said strip or sheet) of printed labels each of which is of a dimension transversely of said strip or sheet which is equal to the major proportion of the transverse width of said strip or sheet. In FIG. 5, on the other hand, the stripper member is for stripping matrix or waste from the carrier strip or backing sheet to leave a succession (longitudinally of said strip or sheet) of printed labels which are both spaced from one another and arranged in threes transversely of said strip or sheet and said stripper member has a total of four spaced abutment portions which are in register with the longitudinally extending portions of said matrix or waste. It is also evident that, in placing the end portions or abutment portions of said stripper members close to the moving web, the prior art in relation to the invention disclosed in said United States Patent Specification was being closely followed, the invention being seen to be in the provision of an intermediate portion which is spaced from the surface of the table or support to prevent smearing of any undried ink by preventing any contact of any part of the printed label with said intermediate portion.

According to a first aspect, the present invention consists in a reel-fed rotary letterpress label converting machine which includes a printing head operable to print matter on the web of paper of self-adhesive stock (as defined above) drawn from a reel of such stock, a rotary die-cutting device operable to cut the paper, which has been printed by said printing head, in such a manner as to permit the waste paper to be thereafter stripped from the backing sheet to leave printed labels on said backing sheet, guide means for introducing an abrupt change of direction in the path of travel of the backing sheet and the printed labels carried thereby and secondary guide means for introducing a change of direction in the path of travel of the waste paper in order to strip said waste paper from the backing sheet, said guide means and said secondary guide means being spaced from one another by a distance greater than the thickness of said printed stock, whereby said waste paper is stripped from the backing sheet without the printing on the labels coming into contact with the secondary guide means.

In a preferred embodiment of said machine, the first-mentioned guide means is constituted by an edge formed by the junction of two plane or substantially plane surfaces, said edge being contained by a plane which also contains the nip of the die-cutting device through which the web of said stock is to be passed.

Preferably, said secondary guide means consists of a freely rotatable stripping roller. Alternatively, said secondary guide means may consist of a suitably curved plate. Whatever form said secondary guide means takes, said secondary guide means is preferably adjustable relative to said second surface in the plane which is generally parallel to the plane which contains said edge and said nip.

The machine preferably includes a rotatable roller interposed between the printing head and the die-cutting device, the backing sheet and the printed web of paper which is supported by said backing sheet passing around said roller and said roller being movable towards or away from said die-cutting device to provide a fine adjustment of the printed matter in relation to the knife edges of said device, whereby the positioning of said printed matter within the label area can be very accurately controlled.

Said machine includes a pull roller driven by a motor through a gear box to draw said stock from the reel thereof through the printing head, the pull roller and the die-cutting device being driven at the same peripheral speed.

Said machine further includes at least one driven shaft carrying a wind-up reel for the backing sheet supporting the printed labels, and another driven shaft carrying a wind-up reel for the waste paper which is stripped from said backing sheet.

The machine will also preferably include means operable to convert the constant input sheet produced by the motor into an output speed which is steplessly variable within a certain range. Said motor will preferably be an electric motor.

According to a second aspect, the present invention consists in a method of manufacturing printed labels using self-adhesive stock (as defined above) which is fed from a reel thereof in a web into a rotary letterpress label converting machine, said method including the following steps, namely, passing said web through the printing head of said machine in order to print matter on the paper of said web, passing said web through a rotary die-cutter in order so to cut said paper as to delineate the desired printed labels and to facilitate the stripping of waste paper from the backing sheet, and subsequently passing said web to a location at which a change of direction is introduced in the path of travel of the waste paper in order to strip said waste paper from the backing sheet and at which an abrupt change of direction is introduced in the path of travel of the backing sheet and the printed labels carried thereby, whereby the waste paper is stripped from the backing sheet without the printing of the labels coming into contact with any surface of any part of the machine at said location.

Figure 2:
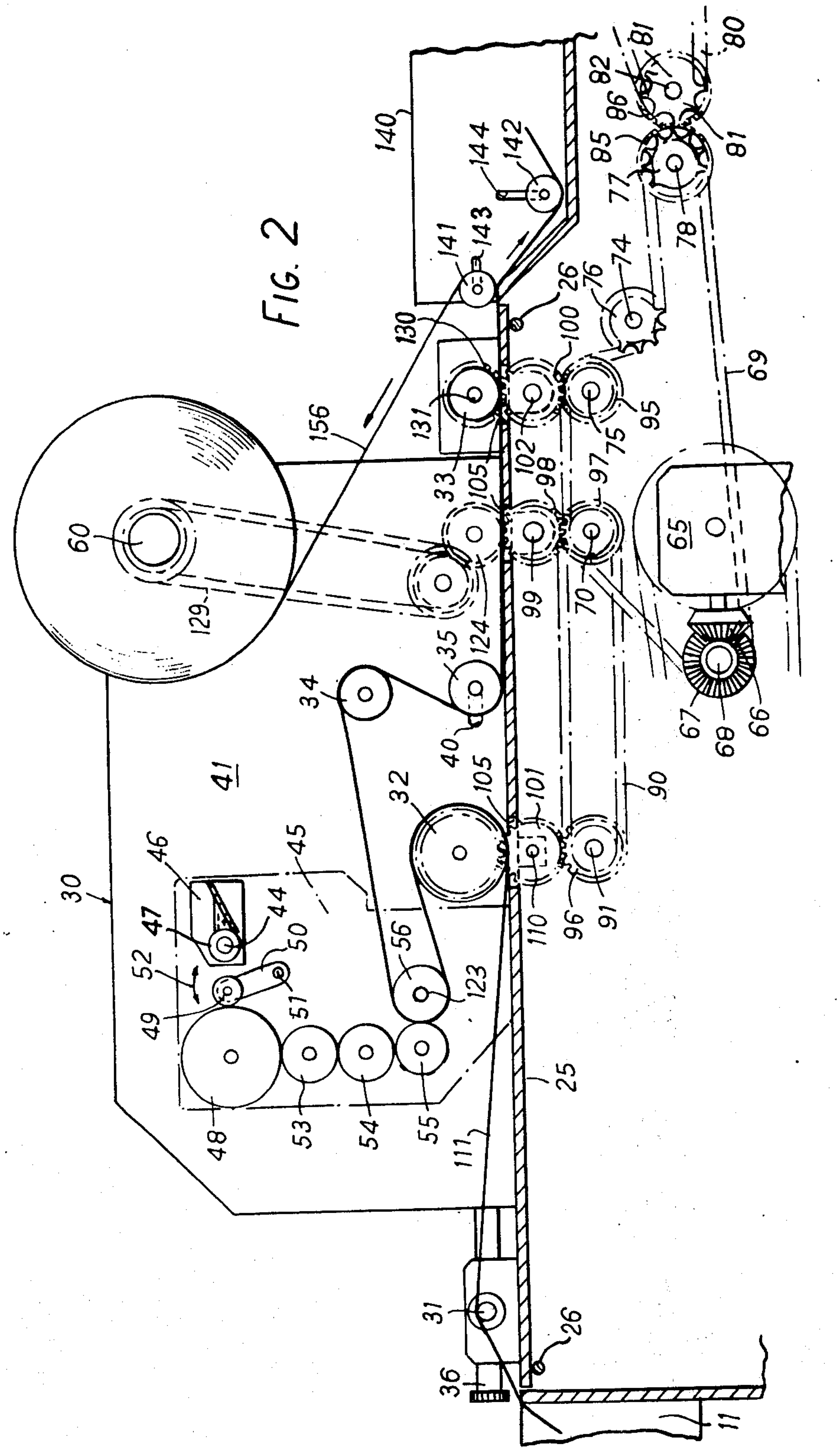
Figure 3:
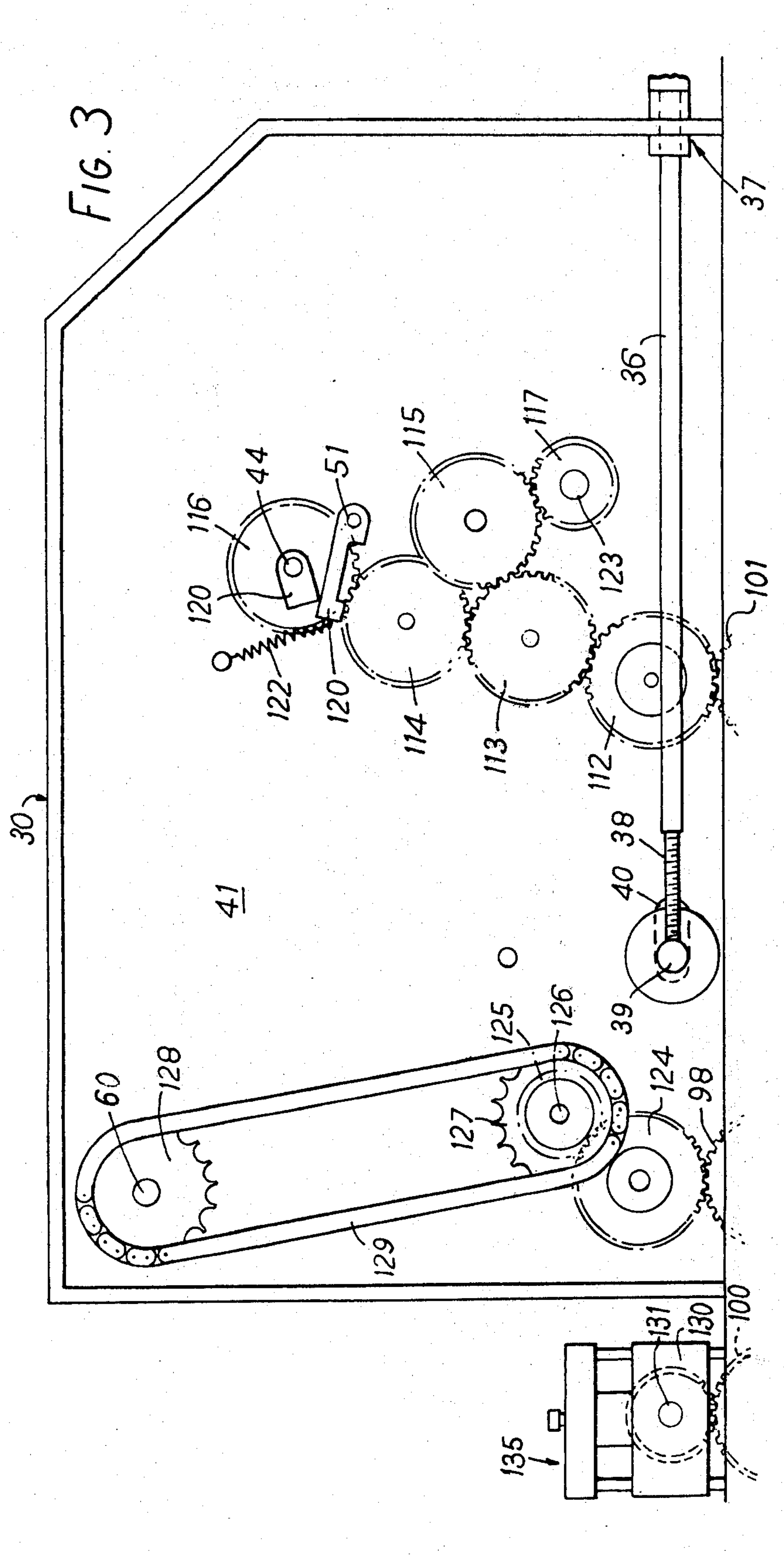

The present invention will now be more particularly described with reference to the accompanying drawings, in which:

FIG. 1 illustrates in perspective one embodiment of a reel-fed rotary letterpress label converting machine according to the present invention; and FIGS. 2 and 3 illustrate diagrammatic elevations of different parts of the drive mechanism of said machine.

Referring to the drawings, the machine will be seen to comprise a generally box-shaped housing 10 from one end of which project parallel spaced brackets 11 (only one of which is visible in FIG. 1) and from the other end of which projects an extension 12 of said housing. Each of said brackets is notched in order to provide journals for opposite end portions of a spindle 13 which extends through a reel 14 of a continuous web of self-adhesive stock (as defined above); the spindle 13 is dropped into said notches and the web of self-adhesive stock can be easily pulled off the reel.

The casing 10 has a raised portion 20 whose horizontal upper surface 21 is at a higher level than the horizontal upper surface 22 of said casing 10. At one end, said surface 21 terminates in an edge 23, said edge being formed by the junction of said surface 21 and an inclined surface 24 which slopes downwardly from said surface 21 to said surface 22.

The surface 21 is provided by a plate 25 which is suitably supported by two solid section rods 26 which extend transversely of said raised portion 20 (see FIG. 2). The plate is held secure by screws 27 extending through vertical side members of said raised portion 20 into the plate 25.

The plate 25 supports a subsidiary housing 30 and other integers of the machine as will now be explained. A guide roller or rod 31 is suitably supported on said plate 25, as also are a pull roller 32 and a rotary die-cutter 33. Two rollers 34, 35 are mounted on a plate 41 of the subsidiary housing 30 in cantilever fashion, the roller 35 being adjustable in position with respect to the edge 23. The adjustments of said roller 35 which are possible are movements of said roller towards or away from said edge 23 in directions parallel to the plane surface 22. The adjustments are effected by a rotatable rod 36 supported by a bearing 37 and having a screw-threaded end portion 38 which coacts with a tapped diametral passageway in a reduced-diameter portion 39 of said roller 35, rotation of said rod 36 in one or the other of its directions of rotation causing said roller to be moved along a slot 40 in said housing 30. Said roller incorporates a known arrangement which includes a knob 41 which is turned in a first direction to slacken off the clamping action exerted on the plate 41 before the desired adjustment described above is carried out, the clamping action being restored by turning said knob in the opposite direction after the adjustment has been made.

A plate 45 is parallel to the plate 41 and said spaced plates not only support the opposite ends of the various rollers of a printing mechanism but also the ink reservoir thereof. Thus, the ink reservoir 46 includes a roller 47 on a shaft 44 and ink is transferred from the surface of the roller 47 to the surface of an oscillating roller 48 by a roller 49 which is carried by a lever 50 which is mounted on a shaft 51 for angular movements in the directions indicated by the double-headed arrow 52. Two transfer rollers 53, 54 are disposed below the oscillating roller 48 and a so-called stereo roller 55 is located below the roller 54 and adjacent an impression roller 56. The stereo roller 55 is given that name because it is intended to support the rubber stereotypes by which invariable matter will be printed; however, said roller 55 is also provided with means for supporting movable type (not illustrated) for printing variable matter.

A waste rewind shaft 60 is provided on said plate 41.

An electric or other motor 65 is mounted on the machine and has an output shaft on the free end of which there is a bevel gear 66 which meshes with another bevel gear 67 which is carried by a shaft 68. Said shaft 68 also has keyed thereto a sprocket (not visible) whose teeth engage a drive chain 69 which also engages the teeth of a first sprocket on a shaft 70 and of a sprocket on a shaft 75 and of an idler sprocket 76 on a shaft 74 and of a sprocket 77 which is mounted on a shaft 78. The sprockets keyed to the shafts 70, 75 are not visible because they are hidden from view by gears and it will be seen from FIG. 2 that the drive chain 69 is endless being formed as a closed loop.

Another endless drive chain 80 engages the teeth of a sprocket 81 which is keyed to a shaft 82 and also the teeth of two additional sprockets (not visible in FIG. 1) which are keyed to rewind shafts 83, 84.

The shafts 78, 82 carry gears 85, 86, respectively, which mesh with one another thereby transmitting the drive from the motor 65 to the rewind shafts 83, 84.

A second sprocket on said shaft 70 is engaged by an endless drive chain 90 which engages a sprocket on a shaft 91 said sprockets not being visible in FIG. 2 for a reason similar to that mentioned earlier. Thus, the drive from the motor 65 is transmitted to the shaft 91.

The various shafts 68, 70, 75, 78, 82 and 91 are all mounted in the body of the machine, namely, within the confines of the housing 10. The rewind shafts 83, 84 project from the extension 12 to provide accessible shaft portion upon which to wind the product of the machine, the drive chain 80 and the sprockets on the shafts 83, 84 being housed within said extension 12.

The shafts 75 and 91 also have gears 95, 96 thereon, respectively, and the shaft 70 has a gear 97 thereon. The gear 97 meshes with a gear 98 which is mounted on a shaft 99 which is also carried by the body of the machine.

The plate 25 carries gears 100, 101 which respectively mesh with the gears 95, 96, said plate 25 being apertured at spaced locations indicated by the reference numeral 105 to permit the drive to be taken from the gears 98, 100, 101. The gear 100 is keyed to a shaft 102 which also carries the anvil (not illustrated) which coacts with the die cutter 33.

The gear 101 is mounted on one end of a shaft 110. Said shaft carries a friction roller (not illustrated) which is intended to transmit drive to the pull roller 32 by friction alone. It will be apparent from the drawings that said friction roller will be in contact with the web 111 which extends around the pull roller 32 and also that the plate 25 will be suitably apertured to permit said friction roller to contact the web 111 which is in contact with said pull roller 32. The gear 101 meshes with a gear 112 which meshes with a gear 113 whose axial dimension is such that it meshes with gears 114 and 115 which are not in mesh with one another. The gear 114 meshes with a gear 116 and and the gear 115 meshes with a gear 117.

The gear 116 is keyed to the shaft 44 (see FIG. 2) of the roller 47 of the ink reservoir and said shaft 44 also has connected thereto an arm 120 whose radially outer end is intended to rock an arm 121 in an anti-clockwise direction (as seen in FIG. 3) about the axis of the shaft 51 against the influence of a tension spring 122 whose opposite ends are secured to the free end of the arm 121 and to the plate 41. This mechanism ensures that the roller 49 will contact the rollers 47 and 48 alternately in order to feed ink to the inking mechanism.

The gear 117 is keyed to one end of a shaft 123 to whose other end the impression roller 56 is keyed.

The gear 98 meshes with a gear 124 which meshes with a gear 125 which is keyed to a shaft 126 which also carries a sprocket 127. The waste rewind shaft 60 also carries a sprocket 128 and an endless drive chain 129 engages the teeth of the two sprockets 127, 128.

The gear 100 meshes with a gear 130 which is keyed to one end of a shaft 131 which forms part of the die cutter 33.

It will be seen that each end of each of the pull roller 32 and the die cutter 33 is provided with well-known means, indicated generally by the reference numeral 135, operable to adjust with great precision the nip between the pull roller 32 and its coacting friction roller and between the die cutter 33 and its coacting anvil.

A plate 140 supports two rollers 141, 142 in such a manner that the position of each of them is adjustable. Thus, the roller 141 is movable along a slot 143 in a horizontal plane relative to the edge 23 constituting a guide means and the roller 141 constituting a secondary guide means. The roller 142 is movable along a slot 144 in a vertical plane relative to the surface 22, said roller being positioned in the vicinity of the junction between the inclined surface 24 and said surface 22.

A rod 150 is also mounted on the plate 140 and said rod supports slitting devices 151 which are used whenever desired (as illustrated).

It will be apparent that (assuming that a length of web has been threaded through the machine so as to have waste connected to the shaft 60 and the ends of the two strips of label-carrying backing sheet connected to the respective shafts 83, 84) upon starting the motor 65 by actuation of a switch 155, the web of self-adhesive stock will be drawn off the reel 14 over the roller or rod 31 to the pull roller 32 and its coacting friction roller. Said web is drawn around the impression roller 56 and the paper is printed by the stereotype(s) or by the stereotype(s) and movable type supported by the stereo roller 55. Thereafter, the printed sheet travels around the rollers 34 and 35 and ultimately passes between the die-cutter 33 and its coacting anvil which co-operate to ensure that the labels are delineated. In fact, as it is well-known, the cutting die or dies cut the printed paper.

The roller 35 is adjustable in position in relation to the die cutter 33 so as to enable the machine operator to control the positioning of the printed matter within the label area.

Having been die-cut the printed web moves to the location at which the unwanted waste 156 is stripped from the backing sheet in order to leave only printed labels 157 on the backing sheet. In order to achieve this, the waste 156 is caused to extend at said location around the secondary guide means or roller 141 and the backing sheet carrying the printed labels 157 is pulled over the guide means or edge 23. It will be seen that an abrupt change of direction is introduced in the path of travel of the backing sheet carrying said printed labels at the edge 23 and this abrupt change of direction, in conjunction with the tension applied to said backing sheet by the driven shafts 83, 84, not only assist the separation or stripping of the waste 156 from the backing sheet but also positively prevent the printed matter on the labels 157 from coming into contact with the periphery of the roller 141.

The labels 157 on the backing sheet are then caused to pass under the roller 142 which may have a cylindrical peripheral surface (as illustrated) which will come into contact with the printed matter on the labels or which may be provided with a number of collars (not illustrated) whose spacing from one another and whose diameters are such that only their cylindrical peripheral surfaces will be in contact with those longitudinally extending portions of the backing sheet which have become exposed as a result of the waste 156 having been stripped off the backing sheet. The provision of such collars would entirely eliminate the possibility of ink-smudging as a result of slip between the roller 142 and the labels 157 in contact therewith because the printed labels would not actually touch the roller surfaces between said collars; however I have not found the use of such collars to be necessary.

The position of the rotational axis of the roller 141 is adjustable relative to the edge 23 by virtue of the provision of the slot 143 and such positional adjustment is desirable because the printed labels which can be manufactured using the machine can be of widely different dimensions, measured longitudinally of the web 111. Thus, for example, if the printed labels being manufactured in a particular run were to be of very small dimension measured longitudinally of said web, it would be necessary to move the roller to the left (as seen in FIG. 1) in order to ensure that the waste 157 would be parted from the backing sheet in advance of the edge 23; such adjustment would be necessary to prevent any labels from being lifted off the backing sheet by the waste as each label passes over the edge 23, it being remembered that the leading edge of each label will tend to lift off the backing sheet momentarily as said backing sheet has the direction of its path of travel abruptly changed as it passes over said edge.

Likewise, the position of the rotational axis of the roller 142 is adjustable relative to the surface 22 by virtue of the provision of the slot 144. Such positional adjustment is desirable because it permits alteration of the degree of abruptness of the change of direction in the path of travel of the backing sheet to suit varied circumstances (for example the quality of the temporary adhesive with which the "sticky" side of the paper has been coated).

I have found that the spacing of the periphery of the strip roller 141 from the edge 23 when said roller has its rotational axis vertically above the edge 23 and at approximately the mid-length point of the slot 143 should preferably be of the order of one eighth of an inch (just over three millimetres) but obviously such dimension cannot be regarded as critical. The spacing chosen must be such as to ensure that accidental contact between the periphery of the roller 141 and the printing on the labels is impossible.

I have not found any smudging or smearing of the printed matter by the roller 35 because the surface thereof is milled and because the web 111 is not under tension (or is under very reduced tension) between the impression roller/stereo roller nip on the one hand and the die-cutter/anvil nip on the other hand.

Known arrangements are provided for adjustment of the pressure at the nip between the impression and stereo rollers 56, 55; these arrangements are not illustrated but in one form are similar to the means 135.

From the above description it will be evident that specially designed and fabricated (and therefore costly) stripper members are not necessary to carry my invention into effect. The roller 141 is simple to manufacture and does not need changing when label size or shape is changed. Change of label size will of course necessitate change of the die-cutter 33 but the need to keep a stock of stripper members for different label sizes and also a stock of die-cutters for different label sizes does not arise with my invention. This is a considerable simplification (which leads to a saving of money) because, in the United Kingdom, there are forty standard label sizes and the numbers of special label sizes must be vast.

My machine is a main line printer (feed in raw stock and the output is a printed die-cut label) which has flexibility because the invariable printed matter is printed by stereotypes and the variable matter can be printed with movable type. This is of the greatest significance to supermarket chains, chains of department stores and so on.

What I claim as my invention and desire to secure by letters patent of the United States is:

1. A rotary letterpress label making machine for making labels from a laminated strip formed of a paper web and a cover web in superposed relation with the side of the paper web facing the cover web coated with adhesive while the other side of the paper web is uncoated, said machine comprising:

a. a frame through which the strip moves from a supply reel;

b. rotary printing means in the frame operable for printing label matter in discrete label regions on the uncoated side of the paper web;

c. die cutting means in the frame operable for cutting through the paper web only and along lines which form closed paths about the label regions to separate the paper web into a continuous waste matrix and discrete label elements;

d. means driving said printing means and die cutting means in synchronism;

e. a support member engaging the cover web side of the strip along a region extending transversely of the strip downstream from the die cutting means and forming a deviating region wherein the cover web and the printed labels thereon is separated from the waste matrix of the paper web;

f. a first guide means engaging the uncoated side of said paper web near said region and guiding the waste matrix in a first direction away from said deviating region;

g. a second guide means spaced downstream from said first guide means engaging the label side of said cover web and guiding the cover web with the labels thereon away from said deviating region in a second direction, said first and second directions diverging in respectively opposite senses from the path of the strip from said die cutting means to said deviating region; and h. first and second wind-up means in the frame engaging the matrix and the cover web respectively and driven for reeling up the matrix and the cover web simultaneously while holding the matrix and cover web taut between the die cutting means and the wind-up means, said second guide means being spaced from said deviating region in a direction perpendicular to the plane of said strip to prevent the said first guide means for engaging the said label elements and thereby damaging the printing thereon.

2. A machine according to claim 1 in which said die cutting means is spaced from said printing means in the direction of movement of the strip in the frame.

3. A machine according to claim 2 in which said support member comprises plate means extending away from said die cutting means in the direction of said path and having an angular region remote from said die cutting means extending at right angles to said path and forming said deviating region.

4. A machine according to claim 2 in which said support member comprises plate means extending away from said die cutting means in the direction of said path and having an angular portion remote from said die cutting means extending at right angles to said path and forming said deviating region, said first guide means comprising a rotatable roller.

5. A machine according to claim 2 in which said support member comprises plate means extending away from said die cutting means in the direction of said path and having an angular region remote from said die cutting means extending at right angles to said path and forming said deviating region, said first guide means comprising a curved plate having a surface convex toward the path taken by the strip upstream from said deviating region and substantially tangent to the strip moving along said path.

6. A machine according to claim 2 in which said first guide means is adjustable in a direction substantially parallel to said path.

7. A machine according to claim 2 which includes roller means in the frame between the printing means and the die cutting means about which the strip is entrained and adjustable in the frame for precise adjustment of the distance travelled by the strip from the printing means to the die cutting means.

8. A machine according to claim 2 which includes a drive roller for engaging the strip to advance the strip from the supply thereof toward said printing means.

9. A machine according to claim 2 in which said second guide means includes roller means between said deviating region and said second wind-up means engaging the label element side of said cover web and adjustable for varying the abruptness with which the cover web deviates from said path at said deviating region.

10. A machine according to claim 2 in which said printing means and die cutting means form at least two side by side rows of printed label elements during movement of the strip along the frame, slitting means in the frame for slitting the cover web between adjacent rows of label elements following separation of the matrix therefrom, said second wind-up means comprising means for winding up each portion of the separated cover web independently.

* * * * *

UNITED STATES PATENT OFFICE
CERTIFICATE OF CORRECTION

PATENT NO. : 3,966,534

DATED : June 29, 1976

INVENTOR(S) : Keith Mason Oddy

It is certified that error appears in the above-identified patent and that said Letters Patent are hereby corrected as shown below:

That the Priority Document was not shown on the patent, and should appear as follows:

Foreign Application Priority Data

March 1st, 1973 United Kingdom 10132/73

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*